United States Patent [19]

Sato et al.

[11] 4,175,278

[45] Nov. 20, 1979

[54] ELECTRIC INSULATING OIL COMPOSITIONS

[75] Inventors: Atsushi Sato; Isoo Shimizu, both of Yokohama; Eiichi Matsuzaka, Tokyo, all of Japan

[73] Assignee: Nippon Petrochemicals Company, Limited, Tokyo, Japan

[21] Appl. No.: 894,117

[22] Filed: Apr. 6, 1978

[30] Foreign Application Priority Data

Apr. 13, 1977 [JP]  Japan .................. 52-41557

[51] Int. Cl.$^2$ .................. C10G 37/08; H01B 3/22; H01B 7/00
[52] U.S. Cl. .................. 361/315; 174/25 C; 208/14; 208/71; 252/63; 252/63.2
[58] Field of Search .................. 208/14, 46, 71; 174/25 C; 361/315; 252/63, 63.2

[56] References Cited

U.S. PATENT DOCUMENTS

| | | | |
|---|---|---|---|
| 3,450,968 | 6/1969 | Cox .................. | 317/258 |
| 3,586,752 | 6/1971 | Mills et al. .................. | 208/14 |
| 3,794,579 | 2/1974 | Enomoto et al. .................. | 208/71 |
| 3,951,780 | 4/1976 | Woo et al. .................. | 208/14 |

FOREIGN PATENT DOCUMENTS

984382  2/1965  United Kingdom .................. 208/14

*Primary Examiner*—Herbert Levine
*Attorney, Agent, or Firm*—Scully, Scott, Murphy & Presser

[57] ABSTRACT

The present invention provides novel electric insulating oil compositions and a process for preparing the same. The electric insulating compositions of the invention comprise distillates within a boiling range in terms of normal pressure between 265° C. and 360° C. obtained by processing a hydrocarbon mixture from cracking of petroleum hydrocarbons at a temperature of 700° C. or higher principally composed of components with a boiling range between 75° C. and 198° C., said components mainly containing monocyclic aromatics and comprising aromatic olefins of said boiling range, in liquid phase in the presence of an acid catalyst under such conditions that the reaction temperature is from 0° C. to 200° C., the liquid residence time is from 0.1 hour to 5 hours and the concentration of aromatic olefins in the reaction system is 10% by weight or below.

8 Claims, 6 Drawing Figures

ELECTRIC INSULATING OIL COMPOSITIONS

BACKGROUND OF THE INVENTION

1. Field of the Invention

The present invention relates to electric insulating oil compositions. More particularly, it is concerned with electric insulating oil compositions obtained by processing cracked oil containing unsaturated components with an acid catalyst.

2. Description of the Prior Art

Heretofore, purified mineral oil, synthetic hydrocarbon oil such as polybutene or alkylbenzene, chlorinated biphenyl or the like has been used as the electric insulating oil. Use of chlorinated biphenyls is now so limited due to their intoxic actions on the human body that they are no longer used as the insulating oil for the general purpose. Also, capacities of the mineral insulating oil and the synthetic hydrocarbon insulating oil are not necessarily satisfactory to meet requirements for ultrahigh-tension electric cables, high-tension and lightweight condensers and transformers. Under such circumstances, development of synthetic insulating oil superior in capacities under high-tension conditions is strongly desired.

In parallel with the higher tension for modern oil-impregnated electric cables, condensers and transformers, capacity requirements for the insulating oil are now becoming stricter, including not only a higher dielectric breakdown voltage (BDV) and a lower dielectric loss tangent (tan $\delta$) but also electric characteristics in the high-voltage electric field. Insulating oil with superior characteristics in the high-voltage electric field such as stabilities toward glow discharge and corona discharge in the case of insulating oil to be impregnated in high-voltage electric instruments, for example, the electric cable, the condenser and the transformer, which possibly undergo high-tension field stress when used is now highly desirable.

Stability toward the corona discharge is determined by the corona starting voltage (CSV) and the corona ending voltage (CEV). The higher the CSV, the corona discharge is less readily discharged, and the higher the CEV, the corona discharge is more readily ended if generated. Accordingly, higher CSV and CEV are both favorable for the insulating oil.

The glow discharge or the corona discharge which occurs inside an insulator in the high-voltage electric field promotes decomposition of the insulating oil thereby causing evolution of decomposition gas which in turn not only induces dielectric breakdown but also causes destruction of the electric instrument itself fitted in the closed container such as the condenser. The gas evolved from insulating oil is mainly composed of hydrogen gas. Therefore, gaseous hydrogen absorbability of an insulating oil has a great effect upon stabilities of the insulating oil toward corona discharge and glow discharge.

On the other hand, in compliance with the abovementioned requirements for higher-voltage electric instruments, films of plastics such as polyolefins, polystyrene and polyesters, for example, polyethylene terephthalate, and particularly polypropylene films (referred to hereinbelow as PP films) have more popularly been used in place of the heretofore employed insulating paper as a part or the whole of electric instruments such as oil-impregnated electric cables and condensers.

Use of plastic films, especially those with a higher dielectric strenght, particularly PP films increases the load voltage per unit thickness of the insulator or dielectric and makes smaller or higher-voltage electric instruments available.

For the oil-impregnated electric instruments employing plastic films, an important characteristic required for the insulating oil to impregnated electric instruments is its capacity to impregnate the plastic films, in addition to BDV, tan $\delta$, CSV and CEV as set forth above.

In the case of insulating papers heretofore employed as the insulator or dielectric, which are aggregates of fine fibers with porous structure so that the impregnation is readily effected by capillarity, there is little difference in impregnatory capability among various kinds of insulating oils. On the contrary, impregnatory capacity of the insulating oil is critical for plastic films.

Since the electric characteristics of oil-impregnated electric instruments such as oil-impregnated electric cables and condensers are well exhibited only when the insulator or dielectric are satisfactorily impregnated with insulating oil, impregnatory capacity of the insulating oil to impregnate plastic films has a great influence upon exhibition of the capacity of an electric instrument as well as reliability of the electric instrument, for example, occurence of troubles.

Whereas heretofore used insulating oils such as mineral oil, alkylbenzene and alkylnaphthalene are practically satisfactory in BDV and tan $\delta$, their hydrogen-gas absorbabilities in the high-voltage electric field are not sufficiently satisfactory. Moreover, these insulating oils are unsatisfactory not only in CSV and CEV but also in capability to impregnate plastic films.

As for BDV which is a criterion for estimating the dielectric strength, it is necessary for the dielectric strength of an insulating oil impregnated in oil-impregnated electric instruments employing plastic films to be not lower than that of impregnated plastic films. If the dielectric strength of insulating oil is lower than that of plastic films, dielectric breakdown of the insulating film will occur earlier than that of the plastic films with a result that the smaller, lighter or higher-voltage electric instrument cannot be produced. In this respect, none of the heretofore employed insulating oils has a dielectric strength or BDV sufficient to meet the requirement.

As a result of extensive studies for finding a satisfactory insulating oil we have completed electric insulating oil compositions excellent not only in BDV, tan $\delta$ and hydrogen-gas absorbability but also in capability to impregnate plastic films.

Whereas the conventionally employed mineral oil, alkylbenzene, alkylnaphthalene and others are satisfactory in practical use for BDV and tan $\delta$, they are not insulating oils sufficiently absorbing hydrogen gas in high-voltage electric field.

SUMMARY OF THE INVENTION

The present invention is concerned with electric insulating compositions comprising distillates within a boiling range in terms of normal pressure between 265° C. and 360° C. obtained by processing a hydrocarbon mixture from cracking of petroleum hydrocarbons at a temperature of 700° C. or higher principally composed of components with a boiling range between 75° C. and 198° C., said components mainly containing monocyclic aromatics and comprising aromatic olefins of said boiling range, in liquid phase in the presence of an acid catalyst under such conditions that the reaction temperature is from 0° C. to 200° C., the liquid residence time is from 0.1 hour to 5 hours and the concentration of aromatic olefins in the reaction system is 10% by weight or below.

BRIEF DESCRIPTION OF THE DRAWING

In FIG. 3, GP is a glass plate, PPF polypropylene film, and GBW a glass weight. The liquor inserted between two films of polypropylene with $5 \times 10^{-3}$ ml. in the parenthesis represents test sample oil.

In FIGS. 1, 2, 4, 5 and 6 (A) is the product of the invention, MO a mineral insulating oil, AB an alkylbenzene insulating oil, AN an alkylnaphthalene insulating oil, and PB a polybutene insulating oil.

DESCRIPTION OF THE INVENTION

Figure 1:
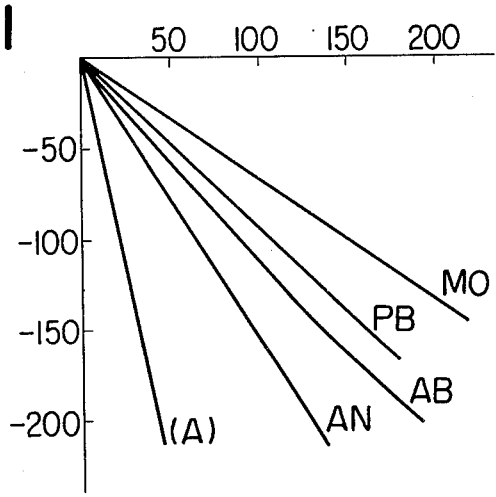
FIG. 1 of the accompanying drawing graphically indicates measurements of hydrogen-gas absorption characteristics (temperature, 50° C., applied voltage, 8 KV) for a product of the invention (A), and products of Comparative Examples MO, AB, AN and PB. The axes of abscisass and cordinates represent time in minute and amount of absorbed hydrogen gas in mmoil, respectively.

The hydrocarbon mixture that may be employed in the present invention is one principally composed of components with a boiling range between 75° C. and 198° C. mainly containing monocyclic aromatics and comprising aromatic olefins of said boiling range which can be obtained by cracking of petroleum hydrocarbons at 700° C. or a higher temperature.

As the hydrocarbon mixture may be used distillates mainly containing components with a boiling range between 75° C. and 198° C. among by-product distillates obtained when petroleum hydrocarbons such as crude oil, naphtha, kerosene, LPG, butane and the like are cracked at a temperature of 700° C. or higher to produce ethylene and propylene. Depending upon the petroleum hydrocarbons to be fed to the cracking, the distillates are composed of monocyclic aromatics containing from 6 to 10 carbon atoms as the major component together with 5–15% by weight of saturated aliphatic hydrocarbons, 2–10% by weight of unsaturated aliphatic hydrocarbons and 2–15% by weight of aromatic olefins. Whereas the distillates may be used as they are as the hydrocarbon mixture in the invention, components of the distillates isolated at synthesized may optionally be added or blended. Alternatively, a hydrocarbon mixture with the same composition as that of the above-mentioned cracked by-product oil, which is obtained by adding to or blending with distillates of the above-defined boiling range from a catalytically refined oil of petroleum hydrocarbons such as naphtha other components within said boiling range from cracking of petroleum hydrocarbons, may also be employed as the hydrocarbon mixture in the invention.

It is believed that monocyclic aromatic components of the distillates with a boiling range between 75° C. and 198° C. from cracking of petroleum hydrocarbons at 700° C. or a higher temperature such as benzene, toluene, xylenes, cumene, propylbenzenes, methylethylbenzenes, diethylbenzenes, tetramethylbenzenes react with other olefinic components in the presence of an acid catalyst to form a heavy component within a boiling range in terms of normal pressure between 265° C. and 360° C. useful as the electric insulating oil. The heavy component is a mixture of various aromatic hydrocarbons, in which the presence of heavy products produced by employing as the starting material a hydrocarbon mixture containing aromatic olefins such as styrene, methylsytrenes, ethylstyrenes and the like is essential for meeting the requirements for the electric insulating oil according to the present invention.

Content of the aromatic olefins in the starting hydrocarbon mixture is not particularly defined, but it is preferable that the ratio of aromatic olefins to aromatic hydrocarbons other than aromatic olefins be in the range from 5 to 100 molar percent. Contents less than 5 molar percent will produce an insufficient yield of the distillates for the electric insulating oil. Contents more than 100 molar percent will form too much unsaturated polymers of aromatic olefins which contaminate the distillates for the electric insulating oil to cause deterioration of the properties.

The starting hydrocarbon mixture contain none of the components with a boiling range over 200° C. Components with boiling points over 200° C. from cracking of petroleum hydrocarbons are condensed polycyclic aromatic hydrocarbons including naphthalene, alkylnaphthalenes and anthracenes. Use of a starting material containing such components is undesirable because there will be formed much heavier polyalkylated products due to higher contents of alkylation-active carbons contained in the said components which reduce the yield of the electric insulating oil according to the invention. On the other hand, distillates with boiling points below 75° C. from cracking of petroleum hydrocarbons contain much dienes such as cyclopentadiene, and presence of such distillates in the starting material will cause polymerization reactions of the dienes to form much viscous substances, which inhibit progress of the acid-catalyzed reaction to reduce the yield of electric insulating oil.

The acid catalysts used in the present invention are preferably solid acid catalysts, mineral acids and so-called Friedel-Crafts catalysts. For example, acidic clay minerals such acid clay and active clay, hydrogen fluoride, sulfuric acid, phosphoric acid, aluminum chloride, zin chlorides, boron fluoride and the like may be employed.

As preferred examples of the solid acid catalyst are mentioned natural clay minerals. Typical clay minerals are kaolinic holloysite clay mineral and montmorillonite clay mineral, which are known as acid clay and sub-bentonite. Also may be employed active clay from treatment of the aforementioned clay minerals, for example, with an inorganic acid such as sulfuric or hydrochloric acid, or an organic acid such as acetic or formic acid, or an aqueous solution thereof. In addition to natural clay minerals, synthetic silica-alumina is a preferred solid acid catalyst, too. It is also preferred to use an inorganic acid such as sulfuric acid, phosphoric acid or hydrogen fluoride, with which due consideration is needed for corrosion of the equipment.

In contacting the cracked oil with the acid catalyst the former should be maintained in liquid phase. Therefore, it is necessary to apply a reaction pressure sufficient to maintain said distillate from cracked by-product oil in liquid phase at a reaction temperature in the range between 0° C. and 200° C. The pressure is, of course, variable depending upon the reaction temperature and usually in the range of 40 kg./cm$^2$ or below. The pressure is not essential for the invention, because it is satisfactory if the cracked oil is liquid at the reaction temperature.

The reaction temperature is critical for the present invention. Below 0° C., undesirable tar substances will be formed due to polymerization reaction to styrenes in unsaturated components of the cracked oil to reduce the yield of the insulating oil. Above 200° C., heat decomposition of the reaction mixture will cause deterioration of the properties. The reaction temperature is varied depending upon the catalyst employed. Preferred temperatures are 100° C. or above for the solid acid catalyst and 100° C. or below for the mineral acid or Friedel-Crafts catalyst.

The liquid residence time is preferably from 0.1 to 5 hours. The period of time less than 0.1 hour will not complete the reaction of unsaturated components, principally aromatic olefins contained in the starting hydrocarbon mixture thereby undesirably reducing the yield of useful electric insulating oil. On the other hand, contact with the acid catalyst for a period longer than 5 hours will cause re-decomposition of the reaction product to increase unsaturated components undesirable for the electric insulating oil thereby adversely affecting properties of the electric insulating oil.

In order to produce the insulating oil distillates in a high yield, it is preferable to carry out the reaction with aromatic olefins present in the reaction system at a concentration of 10% by weight or below. Too high concentration of aromatic olefin and other unsaturated components in the reaction system will increase heavier tar components due to polymerization of the unsaturated components thereby remarkably decreasing the yield of the insulating oil distillates. The unsaturated polymers formed also will be incorporated into the electric insulating oil to deriorate properties of the same. Since content of aromatic olefins in the distillates of cracked oil in the above-cited boiling range is usually 10% by weight or above, it is preferable in practice to recirculate the reaction product or the distillate recovered by distillation to adjust concentration of the unsaturated components.

Among the reaction products from processing of the above-mentioned hydrocarbon mixture in the presence of the acid catalyst under the above-mentioned conditions can be employed as the electric insulating oil according to the invention distillates within a boiling range in terms of normal pressure between 265° C. and 360° C. Components of the distillates within this boiling range are believed to be a mixture of heavy aromatic hydrocarbons from the acid-catalyzed processing of the starting hydrocarbon mixture. The insulating oil exerts electric insulating characteristics superior to any of the prior-art aromatic hydrocarbon insulating oils such as mineral oils, alkylbenzenes, diphenylalkanes and alkylnaphthalenes.

Distillates containing components with boiling points higher than 360° C. are so viscous that they don't satisfactorily impregnate condensers, transformers and POF cables. The lower impregnation will cause dielectric breakdown in the electric instruments owing to the fine residual void. Higher-boiling distillates are not fluid at lower temperatures so that they will deteriorate the low-temperature starting capacity, and therefore they are undesirable for the electric insulating oil. On the other hand, distillates with boiling points lower than 265° C. are low in flashing point so that they are undesirable for operation safety in preparing the electric instruments.

Next, when insulating oil distillates with a boiling range between 265° C. and 360° C. obtained by the acid-catalyzed reaction are used as the insulating oil, so-called clay treatment in which the distillates are treated in the presence of montmorillonite clay mineral or kaolinic halosite clay mineral or an acid-treated product of these minerals is important. The object of this clay treatment is to remove the dissolved water present in a minimum amount or to remove by absorption the polor substances in order to keep electric characteristics at the maximum level. In carrying out the treatment either a batch process or a fixed-bed continuous process may preferably be employed.

The clay treatment may be applied at any stage between the production and the impregnation. The insulating oil distillates may be treated with clay immediately after they are produced or the clay treatment may be performed when the untreated insulating oil is impregnated into the electric instruments to achieve the purpose of removing a minimum amount of impurities for purification of the oil. Either process should be understood to be an embodiment of the present invention.

As typical examples of the montmorillonite clay mineral are known acid clay and sub-bentonite. They are natural minerals variable in composition depending upon the place or origin. As the main components are contained $SiO_2$ and $Al_2O_3$ with a variety of components such as $MgO$, $Fe_2O_3$, $CaO$, $Na_2O$, $K_2O$ and $MnO$ accompanied. Active clay from treatment of the aforementioned clay minerals, for example, with an inorganic acid such as sulfuric or hydrochloric acid, or an organic acid such as acetic or formic acid, or an aqueous solution thereof also is preferably employed.

It is critical for the clay treatment temperature not to exceed 150° C. At extremely high temperatures, activity of the above-mentioned clay minerals as the acid catalyst will become too high with a result that decomposition or isomerization of said insulating oil distillates takes place and deterioration of tan δ and BDV is induced.

The insulating oils of the invention are favorable in their higher flashing points in spite of their lower viscosity to secure safety, better BDV, tan δ and hydrogen-gas absorbabilities as well as higher CSV and CEV.

In addition, due to their high capabilities to impregnate plastic films, particularly PP films, namely, good oil spreading on the film surface or between the film layers or between the film layers and electrode or conductor, the insulating oils according to the invention have been found to achieve higher CSV and CEV itself as well as better resistance to the corona discharge in the oil-impregnated electric instruments employing plastic films, particularly PP films as a part or the whole of the dielectric or insulator which are impregnated in the instruments.

When the insulating oil is low in its capability to impregnate plastic films, there will be formed void by lack of oil impregnation within the elements of the electric instrument. As the result of such void formation, the void is subjected to locally concentrated electric field, and resistance to the corona discharge, or CSV and CEV will also be extremely low with a result that deterioration owing to the corona discharge is accerelated to greatly shorten the life of the electric instrument. The insulating oils of the invention which exhibit better impregnation of plastic films than do prior art insulating oils are advantageous in that they are free from the disadvantages as set forth above. Oil-impregnated electric instruments such as oil-impregnated electric cables and condensers, when impregnated with the insulating oil of the invention, exhibit electric characteristics sufficient to meet the requirements from the use of insulating oil. The life of the instruments is longer and occurence of troubles are lower. The excellent electric characteristics of the insulating oils of the invention also make smaller and higher-voltage electric instruments available.

Moreover, the insulating oils according to the invention are of better capabilities to impregnate plastic film than those of prior art insulating oils. This enables production of electric instruments very high in CSV and CEV as compared with those employing prior art insulating oils, in combination with the excellent electric characteristics of the insulating oil itself as mentioned above.

Oil-impregnated condensers particularly preferably impregnated with the insulating oils of the invention are those in which plastic films, particularly PP films with smooth or rough surfaces formed, for example, by means of an emboss process, to be used as a part or the whole of the dielectric, and metal foils, metal thin layers attached by vacuum vaporization or plated metal thin layers to be used as electrode layer are wound, laminated and impregnated with an insulating oil. These condensers are preferred because of very high CEV which is the most important for realizing smaller electric instruments.

DESCRIPTION OF PREFERRED EMBODIMENTS

EXAMPLE 1

In an autoclave 10 l. in volume are placed 1 l. of cracked by-product oil from ethylene production and 100 g. of acid clay. The oil contains 94.6% by weight of components with a boiling range between 75° C. and 198° C., the initial distilling temperature being 68° C. and the 97%-distilling temperature being 175° C., and it is of a composition of 13.7% by weight of saturated aliphatics, 68.5% by weight of aromatics and 17.8% by weight of olefins. The autoclave is pressurized with 30 kg/cm$^2$ of nitrogen, heated with stirring and maintained at a temperature of 150° C. If rapid temperature rise is observed around a temperature of 110° C. due to the reaction heat, it is preferred to discontinue the heating temporarily. Then, additional 5 l. of the above-mentioned by-product oil is added dropwise over a period of 3 hours. After completion of the addition, heating with stirring is continued for additional 1 hour.

After cooled, the acid clay is separated by filtration. Under normal pressure is recovered 3.65 kg. of a lighter distillate distilling up to a temperature of 190° C. Under reduced pressure at 3 mm.Hg is then recovered the following separated distillates.

| Distillate | Distillation Range (3 mm.Hg.) (°C.) | Boiling range at normal pressure (°C.) | Yield (g.) | |
|---|---|---|---|---|
| 1 | 60–110 | 195–265 | 340 | Comparative Example 5 |
| 2 | 110–185 | 265–340 | 850 | Insulating oil of the invention |
| 3 | 185–240 | 340–425 | 240 | Comparative Example 6 |
| 4 | — | — | 140 | Distillation residue |

To distillates 1–3 is added 2.5% by weight of active clay, and the clay treatment is performed under nitrogen atmosphere at a temperature of 50° C. for a period of 2 hours. Properties of the distillates and known insulating oils, mineral oil (MO), alkylbenzene (AB), alkylnaphthalene (AN) and polybutene (PB) are shown in the table below.

| | Example 1 of the invention | Comparative Example | | | | | |
|---|---|---|---|---|---|---|---|
| | | MO | AB | AN | PB | Distillate 1 | Distillate 3 |
| Viscosity (cst 100° F.) | 4.9 | 6.4 | 10.5 | 10.0 | 137 | 3.4 | 540 |
| Flashing point (PMCC °C.) | 145 | 135 | 125 | 140 | 135 | 73 | 200 |
| Pour point (°C.) | $\leq -50$ | −34 | $\leq -50$ | $\leq -50$ | −48 | $\leq -50$ | 5 |
| Volume resistivity (80° C. Ω cm) | $4 \times 10^{15}$ | $1 \times 10^{14}$ | $9 \times 10^{15}$ | $3 \times 10^{15}$ | $2 \times 10^{15}$ | — | — |
| Dielectric constant (80° C.) | 2.5 | 2.1 | 2.2 | 2.4 | 2.0 | — | — |
| BDV (KV/2.5 mm. 80° C.) | $\geq 70$ | 52 | 68 | $\geq 70$ | 43 | — | — |

-continued

| | Example 1 of the invention | Comparative Example | | | | |
|---|---|---|---|---|---|---|
| | | MO | AB | AN | PB | Distillate 1 | Distillate 3 |
| tan δ (%, 80° C.) | 0.03 | 0.02 | 0.02 | 0.03 | 0.03 | — | — |

Due to its lower flashing point, Distillate 1 is unpreferable for the insulating oil from the safety point of view for electric instruments. Distillate 3 is also unpreferable due to its higher pour point and viscosity by which residual bubbles will readily be formed between insulation elements and capacities of the electric instrument is deteriorated in colder places.

The product according to the present invention has a higher flashing point despite its lower viscosity as compared with other hydrocarbon insulating oils. This is desirable for oil-pouring operation efficiency and safety of the oil-impregnated electric intruments.

The product of the invention which is high in dielectric constant is particularly satisfactory when used as a condenser oil for smaller condensers.

Figure 2:
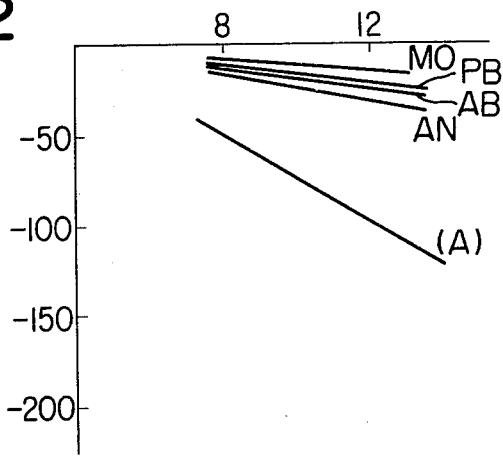
FIG. 2 shows relationship between applied voltage and hydrogen gas absorbability measured (temperature, 50° C., time, 10 minutes) with a product of the invention (A) and products of Comparative Examples MO, AB, AN and PB. The axes of abscisass and cordinates represent applied voltage in KV and amount of absorbed hydrogen gas mmoil.

Results of measurements of hydrogen-gas absorption characteristics with a product of the invention and products of Comparative Examples MO, AB, AN and PB are shown in FIG. 1 and FIG. 2 of the accompanying drawing. The measurements were done by the method of the Insulating Oil Division.

As evidently shown in FIGS. 1 and 2, the insulating oil according to the invention is superior in absorbability of the decomposition gas from discharge.

The hydrogen absorbability under high load voltage is especially excellent so that the product is a synthetic oil satisfactory for use under high voltage in electric instruments.

EXAMPLE 2

An electric insulating oil was prepared using the ethylene cracked by-product oil from ethylene production used in Example 1 by the process as set forth below. As the acid catalyst is used 90% sulfuric acid and the diluent at the initial stage 0.5 l. of the lighter distillate recovered in Example 1.

In a reaction vessel 10 l. in volume equipped with a stirrer and a thermometer are placed the diluent and 200 g. of 90% sulfuric acid, and the mixture is cooled to a temperature of 7°-12° C. While cooling to keep the temperature not above 15° C., 5 l. of the cracked by-product oil is added dropwise over a period of 3 hours. After completion of the addition, stirring is continued for additional 30 minutes.

After completion of the reaction, the reaction mixture was washed with water and subjected to distillation under normal pressure to recover 3.2 kg. of a light distillate distilling up to a temperature of 190° C. Then, distillation under a reduced pressure of 3 mm.Hg yielded 0.76 kg. of an insulating oil distillate distilling between 120° C. and 160° C.

Clay treatment was performed in the same way as in Example 1.

Electric characteristics are shown in Table 2.

EXAMPLE 3

A processing was carried out in the same way as in Example 2 using 10 g. of anhydrous aluminum chloride as the acid catalyst at a reaction temperature of 50°-55° C. There was produced 0.68 kg. of an insulating oil distillate. Electric characteristics after the clay treatment are shown in Table 2.

Table 2.

| Example | 2 | 3 |
|---|---|---|
| Volume resistivity (80° C. Ω cm) | $6 \times 10^{15}$ | $5 \times 10^{15}$ |
| Dielectric constant (80° C.) | 2.5 | 2.4 |
| BDV (KV/2.5 mm. 80° C.) | ≧70 | ≧70 |
| tan δ (%, 80° C.) | 0.01 | 0.02 |

EXAMPLE 4

Effects of the clay treatment temperature

To the insulating oil distillate obtained in Example 2 was added 2.5% by weight of active clay. The clay treatment was performed under nitrogen atmosphere for 2 hours respectively at temperatures of 20° C., 50° C., 100° C., 150° C. and 200° C. Results of the tan δ measurement are shown below.

| Treatment temperature (°C.) | Untreated distillate | 20 | 50 | 100 | 150 | 200 |
|---|---|---|---|---|---|---|
| tan δ (%, 80° C.) | 0.12 | 0.04 | 0.03 | 0.03 | 0.04 | 0.22 |

EXAMPLE 5

Figure 3:
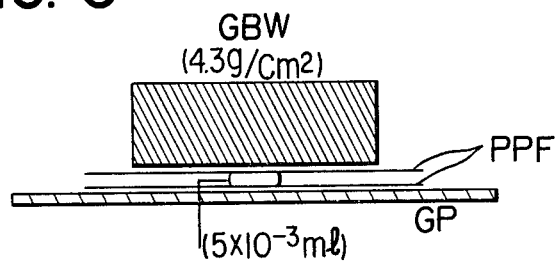
FIG. 3 is the outline of an apparatus to measure oil spreading between polypropylene films on the product of the invention (A), and the products of the Comparative Examples (MO, AB, AN and PB).

A measurement was made on spreading of the insulating oils between film layers. As shown in FIG. 3, on a polypropylene film PPF (TORAYFAN T-2400 manufactured by Toray, with no surface treatment applied) was dropped. $5 \times 10^{-3}$ ml. of Distillate 2 of the invention obtained in Example 1 and known products MO, AB, AN and PB used in the Comparative Examples, respectively. The film was immediately covered with another film of the same polypropylene, upon which a glass weight GBW (4.3 g./cm$^2$) was placed. Measurements were done at room temperature.

Area of the oil spread between the plastic films was measured at 5-minute intervals by means of the naked eyes from above. The results are shown in FIG. 4.

Figure 4:
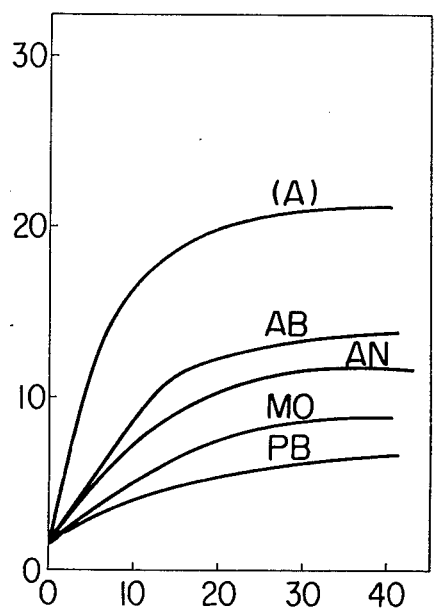
FIG. 4 shows the results of the measurements employing the apparatus in FIG. 3. The axes of abscisass and cordinates respectively represent time in minute and area of the test sample in $cm^2$.

The results shown in FIG. 4 indicate that the insulating oil of the invention is superior in spreading between the polypropylene films.

EXAMPLE 6

As the dielectric were used PP films and insulating papers of the compositions shown in Table 3. Aluminum foils (thickness 6μ, width 80 mm., length 9.5 m.) were used as the electrode, and winding and laminating were done in a conventional manner to prepare model condensers with various proportions of PP films contained in the dielectric.

The condensers were vacuum sealed with Distillate 2 insulating oil of the invention obtained in Example 1 and the known insulating oils used in Example 1 for comparison's sake, respectively, to prepare oil-impregnated condensers with an electrostatic capacity of about 0.5 μF. The voltage was increased to measure corona starting voltage CSV and corona ending voltage CEV.

Figure 5:
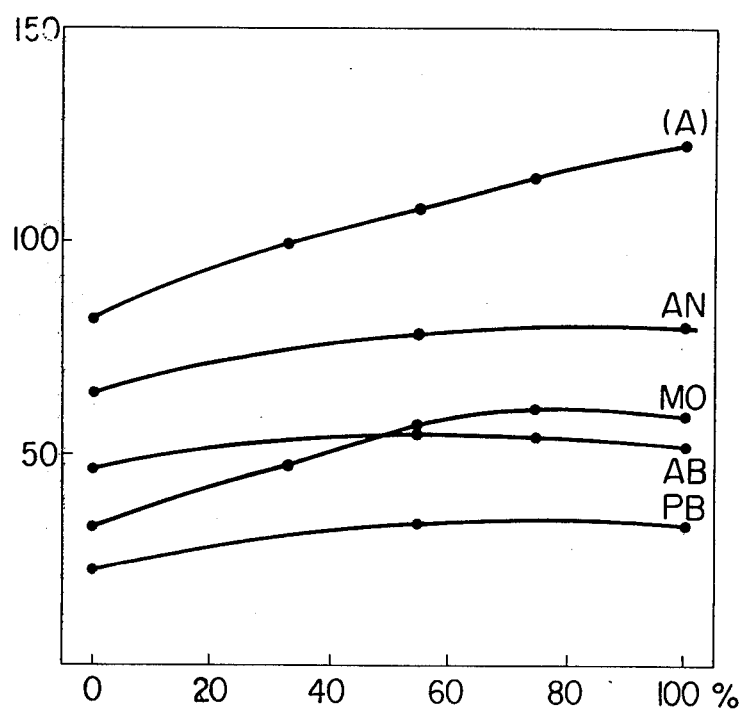
FIG. 5 and FIG. 6 indicate relationship between CSV (corona starting voltage) and CEV (corona ending voltage) and the proportion of propylene films contained in the dielectric on the product of the invention (A) and the products of the Comparative Examples (MO, AB, AN and PB). The axes of abscisass in FIGS. 5 and 6 respectively represent CSV in KV/mm. at 30° C. and CEV in KV/mm. at 30° C. The axes of cordinates in FIGS. 5 and 6 each represent the proportion of polypropylene film contained in the dielectric.
Figure 6:
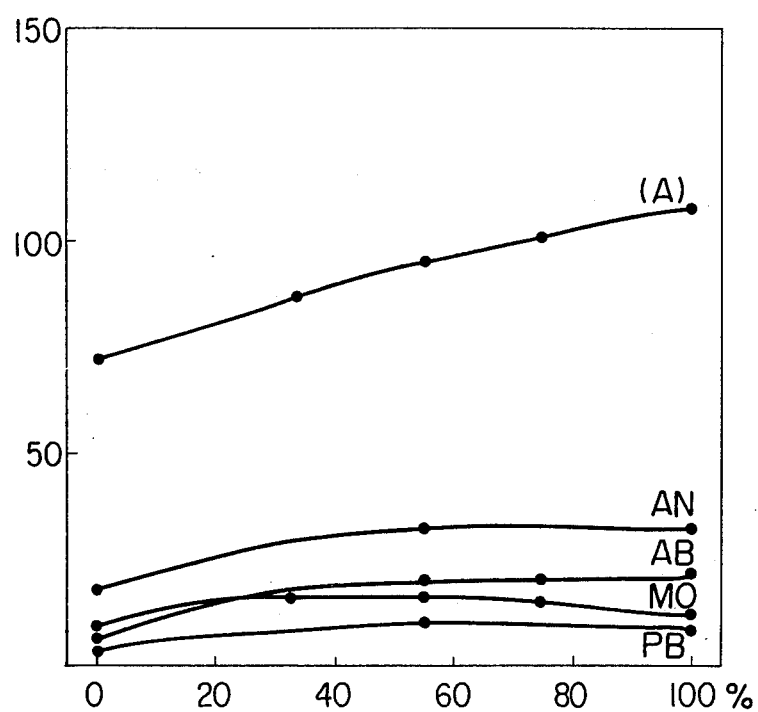

The results shown in FIGS. 5 and 6 indicate that the condensers with the insulating oil of the invention exhibit higher CSV and CEV and that the higher the proportion of PP film contained in the dielectric, the higher rate CSV and CEV. On the other hand, use of the known insulating oils in nature results in low CSV and CEV, which are not increased with increase in the proportion of PP film so much as with the resulting oil of the invention.

Table 3.

| Proportion of polypropylene contained in the dielectric (%) | Composition of the dielectric (thickness in $\mu$) | | |
|---|---|---|---|
| 0 | CP (18) / | CP (18) / | CP (18) |
| 33 | CP (18) / | PP*-1 (18) / | CP (18) |
| 54 | CP (13) / | PP*-2 (30) / | CP (13) |
| 75 | PP*-2 (19.5) / | CP (13) / | PP*-2 (19.5) |
| 100 | PP*-2 (18) / | PP*-2 (18) / | PP*-2 (18) |

CP:Capacitor paper, MITSUBISHI low density paper 100 mm. in width, 9.5 m. in length manufactured by Mitsubishi Seishi K.K.
PP:Polypropylene Film
*-1 TORAYFAN Type T-2400, 100 mm. in width with no surface treatment applied, 9.5 m. in length, manufactured by Toray K.K.
*-2 SHINETSU Type R, 100 mm. in width with no surface treatment applied, 9.5 m. in length, manufactured by Shinetsu Film K.K.

We claim:

1. Electric insulating oil compositions comprising distillates within a boiling range in terms of normal pressure between 265° C. and 360° C. obtained by processing a hydrocarbon mixture from cracking of petroleum hydrocarbons at a temperature of 700° C. or higher principally composed of components with a boiling range between 75° C. and 198° C., said components consisting essentially of monocyclic aromatics and comprising aromatic olefins of said boiling range in liquid phase in the presence of an acid catalyst uder such conditions that the reaction temperature is from 0° C. to 200° C., the liquid residence time is from 0.1 hour to 5 hours and the concentration of aromatic olefins initially in the reaction system is 10% by weight or below.

2. Electric insulating oil compositions according to claim 1 wherein the hydrocarbon mixture contains aromatic olefins in a ratio of from 5 to 100 molar percent aromatic olefins to non-olefin aromatic hydrocarbons.

3. Electric insulating compositions according to claim 1 or 2 wherein said composition also comprises plastic film which is impregnated with said distillate.

4. Electric insulating compositions according to claim 3 wherein said plastic film is polypropylene film.

5. Electric insulating compositions according to claim 4 wherein the impregnated film is the dielectric of a condenser.

6. Electric insulating compositions according to claim 4 wherein the impregnated film is the dielectric of an electric cable.

7. Electric insulating compositions according to claim 5 in which plastic films constituting a part or the whole of the dielectric and electrode layers are wound, laminated and impregnated with said distillate.

8. Electric insulating composition according to claim 7 wherein the plastic films are polypropylene films.

* * * * *